(12) United States Patent
Kürschner et al.

(10) Patent No.: US 10,168,021 B2
(45) Date of Patent: Jan. 1, 2019

(54) LIGHT GUIDING DEVICE

(71) Applicant: SMR Patents S.à.r.l., Luxembourg (LU)

(72) Inventors: Norbert Kürschner, Wedemark (DE); Daniel Fritz, Stuttgart (DE)

(73) Assignee: SMR Patents S.à.r.l., Luxembourg (LU)

( * ) Notice: Subject to any disclaimer, the term of this patent is extended or adjusted under 35 U.S.C. 154(b) by 79 days.

(21) Appl. No.: 15/000,733

(22) Filed: Jan. 19, 2016

(65) Prior Publication Data

US 2016/0209000 A1 Jul. 21, 2016

(30) Foreign Application Priority Data

Jan. 19, 2015 (EP) .................................. 15151604

(51) Int. Cl.
*F21V 7/00* (2006.01)
*B60Q 1/26* (2006.01)
*B60R 1/12* (2006.01)
*F21V 8/00* (2006.01)
*B60Q 1/52* (2006.01)
*F21V 7/22* (2018.01)
(Continued)

(52) U.S. Cl.
CPC .......... *F21V 7/0091* (2013.01); *B60Q 1/2607* (2013.01); *B60Q 1/2665* (2013.01);
(Continued)

(58) Field of Classification Search
CPC . F21V 7/0091; F21V 7/22; F21V 9/08; B60Q 1/2607; B60Q 1/2665;
(Continued)

(56) References Cited

U.S. PATENT DOCUMENTS 4,912,606 A * 3/1990 Yamamoto ........... B60Q 1/2607
362/518
6,428,176 B1 8/2002 Nelson
(Continued)

FOREIGN PATENT DOCUMENTS

DE 202012100398 U1 2/2012
EP 1167870 A2 1/2002
(Continued)

OTHER PUBLICATIONS

European Extended Search Report, Application No. EP 15151604.4 dated Jul. 2, 2015.

*Primary Examiner* — Bryon T Gyllstrom
(74) *Attorney, Agent, or Firm* — MacMillan, Sobanski & Todd, LLC

(57) ABSTRACT

A light guiding device for an illumination device, especially for a motor vehicle or an indicator device in a rearview device of a motor vehicle includes a light coupling side for incoupling light from a light source, a reflection side having a reflection layer; and a light outcoupling side, which is disposed generally opposite the reflection side. A clearance between the reflection side and the light outcoupling side generally decreases as the distance from the light incoupling side increases. The reflection side having the reflection layer is configured so that light arriving from the light incoupling side is deflected to the light outcoupling side. The reflection layer may be a paint or lacquer layer that is imprinted or evaporation-coated on the reflection side.

11 Claims, 3 Drawing Sheets

(51) Int. Cl.
*F21V 9/08* (2018.01)
*F21S 43/239* (2018.01)
*F21S 43/31* (2018.01)
*F21S 43/14* (2018.01)
*F21S 43/249* (2018.01)

(52) U.S. Cl.
CPC ........... *B60Q 1/2696* (2013.01); *B60Q 1/525* (2013.01); *B60R 1/1207* (2013.01); *F21S 43/239* (2018.01); *F21S 43/315* (2018.01); *F21V 7/22* (2013.01); *F21V 9/08* (2013.01); *G02B 6/0046* (2013.01); *G02B 6/0055* (2013.01); *F21S 43/14* (2018.01); *F21S 43/249* (2018.01); *G02B 6/0078* (2013.01)

(58) Field of Classification Search
CPC .... B60Q 1/2696; B60Q 1/525; B60Q 1/1207; F21S 48/2243; F21S 48/236; G02B 6/0046; G02B 6/0055
USPC .......................................................... 362/511
See application file for complete search history.

(56) References Cited

U.S. PATENT DOCUMENTS

| | | | |
|---|---|---|---|
| 6,926,432 B2 * | 8/2005 | Rodriguez Barros | B60Q 1/2665 362/494 |
| 7,097,334 B2 * | 8/2006 | Ishida | F21S 41/147 362/516 |
| 7,331,694 B2 * | 2/2008 | Lee | G02B 6/0018 362/231 |
| 7,350,930 B2 * | 4/2008 | Lee | F21V 5/04 353/98 |
| 7,513,665 B2 * | 4/2009 | Chinniah | F21S 41/147 362/507 |
| 7,771,062 B2 * | 8/2010 | Kuhn | B60Q 1/2665 359/839 |
| 8,033,706 B1 * | 10/2011 | Kelly | G02B 6/0036 362/307 |
| 2004/0109105 A1 * | 6/2004 | Nagakubo | G02B 6/0055 349/65 |
| 2005/0195074 A1 * | 9/2005 | Kano | B60Q 1/2665 340/475 |
| 2013/0188377 A1 * | 7/2013 | Konishi | B60Q 1/04 362/511 |
| 2015/0055361 A1 * | 2/2015 | Ogata | B60Q 1/28 362/511 |
| 2015/0131324 A1 * | 5/2015 | de Lamberterie | G02B 6/0035 362/623 |
| 2016/0193955 A1 * | 7/2016 | Ogata | B60Q 1/0052 362/511 |

FOREIGN PATENT DOCUMENTS

| | | |
|---|---|---|
| EP | 1167870 A3 | 10/2002 |
| EP | 1970736 A1 | 9/2008 |
| EP | 2463157 A1 | 6/2012 |
| WO | 01/27529 A1 | 4/2001 |

* cited by examiner

LIGHT GUIDING DEVICE

CROSS-REFERENCE TO RELATED APPLICATIONS

This application claims the benefit of European Patent Application No. EP 15151604.4, filed Jan. 19, 2015, the disclosure of which is incorporated herein by reference in its entirety.

BACKGROUND OF THE INVENTION

The invention relates to a light guiding device for an illumination device, such as a backlight or interior or exterior lighting, wherein incident light is deflected by reflection. The light guiding device can particularly be used in an indicator of a motor vehicle, in connection with a blind spot monitor in an outside mirror for example. The invention also relates to a like illumination device, an outside mirror having such a light guiding device and a method for producing such a light guiding device.

In known light guiding devices, it has proven disadvantageous that the light deflected by the light guiding device is outcoupled relatively inhomogeneously over a surface to be illuminated. This effect becomes ever more obvious, the larger the surface to be illuminated and the greater the distance between the surface to be illuminated and a light source. For example if a pictogram of small line width, 0.4 mm for example, of a blind spot monitor is backlit by a known light guiding device, the inhomgeneity can be negligible. As the line width of the pictogram increases, 1.0 mm for example, the inhomogeneity becomes quite visible and the user finds it disturbing. In the extreme case, a very non-uniform illumination of a pictogram can cause the user to misinterpret an indicator light as not illuminated.

WO 01/27529 A1 describes a light guide having an input edge surface, a back surface and an output surface, wherein a reflector is fastened directly to the back surface by gluing for example.

From EP 2463157 A1 there is known a rearview mirror assembly having at least one mirror base, a mirror head covering which covers a mirror glass in the mirror head, and an optical indicator light that produces light in reaction to a sensor signal to inform an operator about hazardous information, wherein the light shines through the mirror glass. The mirror glass is mounted on a backing plate that has a mounting space for at least one LED and at least one beveled light guide.

EP 1167870 A2 discloses a lamp for vehicles, especially for motor vehicles, comprising a lamp housing that is bounded by a front disc in the emission direction, and at least one elongate light conduction element having a light exit surface on its front side, a reflection surface on its rear side facing away from the front side and a light input surface at one end which is coupled to a light source, wherein the light exit surface of the light conduction element is configured as part of the front disc.

From DE 202012100398 U1 there is known an illumination apparatus having at least one illuminant that is arranged on a printed circuit board enabling it to be connected to a power supply, wherein the printed circuit board is at least partially imbedded in a transparent first casting compound that enables a selective light exit of the light generated by the illuminant over at least one light exit area. To this end the printed circuit board extends perpendicular to the light exit area, is arranged in and is at least partially surrounded by the first transparent casting compound, and at least one light influencing element having light-reflecting properties at least on one of its two main surfaces is arranged in the first casting compound.

EP 1970736 A1 relates to a rearview mirror for vehicles, especially motor vehicles, having a mirror glass mounted to a carrier plate and a indicator unit which is disposed behind the mirror glass and the carrier plate and generates a light beam by means of at least one illuminant, wherein the light beam is coupled into a light conductor, which is provided with decoupling optics by which the light beam is directed outward by at least one portion of the mirror glass that is at least partially reflection-free, wherein the light passing through the mirror glass is directed towards the driver.

In one embodiment example of the invention a light guiding device is provided that improves a homogenous light distribution on a light outcoupling surface.

This embodiment and other embodiments disclosed herein or understood as equivalent structures are described by a light guiding device having the features of claim 1.

Additional embodiments or features of light guiding devices according to the invention are described in claims 2 through 10.

SUMMARY OF THE INVENTION

The light guiding device has a light incoupling side for coupling light from a light source into the light guiding device, a reflection side having a reflection layer for reflecting the incoupled light and a light outcoupling side. The light outcoupling side is preferably disposed essentially opposite the reflection side. The clearance between the reflection side and the light outcoupling side preferably basically decreases as the distance from the light incoupling side increases. This decrease of the clearance can occur at least partially non-linear. In other words, the reflection side and/or the reflection layer can not only extend linearly inclined relative to the light outcoupling side, but can also extend arc-shaped or convex. The reflection side having the reflection layer is embodied so that the light arriving at the light outcoupling side from the light incoupling side is deflected in order to thus produce a light distribution on the light outcoupling side that is more uniform or is as uniform as possible.

The light guiding device can comprise a light guide body upon which the light incoupling side, the light outcoupling side and the reflection side are formed.

The light guiding device can be used in an illumination device to produce an illumination result over a certain surface that is as homogenous as possible by means of one or a plurality of light sources having a relatively limited light distribution, LEDs for example. The light guide device can be used in an indicator device of a motor vehicle, for example. An example is an indicator device in a rearview device like a driver assistance system, such as a blind spot monitor. The light guiding device according to the invention can particularly be used for the most homogenous possible illumination or backlighting of a pictogram, such as a blind spot monitor for example.

The reflection layer is arranged on the reflection side. The reflection layer is a paint or lacquer layer that is imprinted or evaporation-coated on the reflection side.

In another embodiment, the reflection layer can be made of another material or of the same material as the rest of the light guiding device. Preferred materials are plastics, especially acrylonitrile-butadiene-styrene (ABS) and or polymethyl methacrylate (PMMA) or plastics with similar material properties. For example, both the reflection layer and the rest of the light guiding device are made of PMMA. The light guiding device can also be a two-component plastic injection molded part, wherein the reflection layer is injected as an ABS plate, white or colored for example, and then the rest of the light guiding device is formed on the reflection layer with transparent or clear PMMA.

The reflection side and/or the reflection layer can be configured at least partially step-like and/or wave-like. The steps or waves are embodied so that the light arriving from the light incoupling side is deflected so that it exits from the light outcoupling side as uniformly as possible.

The light incoupling side and the light outcoupling side can be configured flat and these surfaces can be arranged essentially orthogonal or approximately orthogonal to one another. The surfaces of the light incoupling side and the light outcoupling side can form planes. The upper surface of the light incoupling side can be embodied or shaped in such a manner that light arriving from a light source is coupled into the light guiding device as completely as possible and preferably as parallel to the light outcoupling side as possible. To this end in particular the light incoupling side can demonstrate one or a plurality of optical systems and/or recesses, wherein light sources can be at least partially inserted into the recesses.

The light guiding device can be embodied so that light coupled into the light guiding device and/or reflected and/or outcoupled essentially experiences no change in color. To this end, the reflection layer can be made of a color-neutral material, which is silvery or white. A change in color can be obtained by arranging one or a plurality of color filters on the light incoupling side and/or the reflection side and/or the reflection layer and/or the light outcoupling side and/or inside the light guiding device. The light from a light source that emits white light can thereby be coupled out of the light guiding device colored, red or yellow or green for example. A color layer can have a heat resistance of around −40° C. to +115° C.

The light guiding device can furthermore demonstrate one or a plurality of holding devices to tightly or loosely fasten the light guiding device to a printed circuit board.

The invention furthermore relates to an illumination device according to claim 11 having a light guiding device comprising at least one of the aforementioned features and a printed circuit board upon which at least one light source is arranged. The light source is arranged relative to the light guiding device so that the light emitted by the light source is at least partially incoupled on the light incoupling side of the light guiding device. The light is subsequently reflected from the reflection side and/or the reflection layer and outcoupled on the light outcoupling side. The illumination device can be used in a motor vehicle, such as in an indicator device of a rearview device of a motor vehicle.

Claims 12 to 14 describe a method for producing a light guiding device. To this end, the reflection layer can be arranged on the base body in a pad printing machine, wherein optional cover templates can be used.

Claims 15 and 16 describe a rearview device for a motor vehicle comprising a rearview reflection surface, one or a plurality of illuminants and a light guiding device according to the invention, wherein the illuminant and the light guiding device can be an indicator of a blind spot monitor. To this end, the light guiding device, light source and rearview reflection surface can be arranged together in such a way that the light guiding device deflects the light emitted by the light source to a side of the rearview reflection surface facing away from the driver of the vehicle. Thus one area of the rearview reflection surface can be visibly illuminated for the driver to provide an indicator function, a blind spot monitor for example.

One region of the rearview reflection surface can comprise a recess or a partially reflecting part, such as a pictogram that the light source and the light guiding device visibly backlight for a driver.

Various aspects of this invention will become apparent to those skilled in the art from the following detailed description of the preferred embodiment, when read in light of the accompanying drawings.

DETAILED DESCRIPTION OF THE PREFERRED EMBODIMENTS

Figure 1:
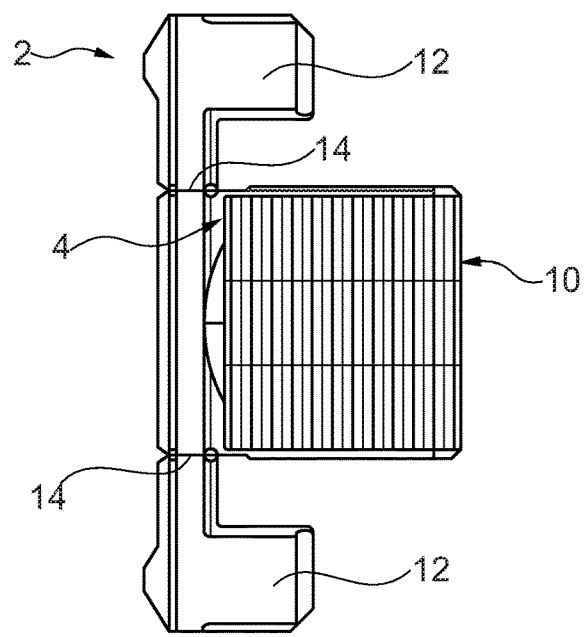
FIG. 1 is a top view of a first embodiment example of the light guiding device.

FIG. 1 depicts a top view of a light guiding device 2 having a light incoupling side 4, a reflection side 6, a reflection layer 8 (see FIG. 2), and a light outcoupling side 10. In the top view of FIG. 1 the reflection side 6 is disposed under the light outcoupling side 10 and the reflection layer 8 is disposed under the reflection side 6. The light outcoupling side 10 is disposed opposite the reflection side 6 and therefore also opposite the reflection layer 8, so that reflected light reaches the light outcoupling side 10 as uniformly as possible. The clearance between the light outcoupling side 10 and the reflection side 6 and therefore also the reflection layer 8 decreases as the distance from the light incoupling side 4 increases. The light outcoupling side 10 and the reflection side 6 can thus converge continuously or form an edge 14 that can also have a reflection layer 8.

By way of example FIG. 1 moreover depicts two holding devices 12, which extend away from the light guiding device 2 in the plane of the light outcoupling side 10, wherein each holding device demonstrates a predetermined breaking point 14. Depending on the application of the light guiding device, in a right or a left rearview device of a motor vehicle for example, the unneeded holding device 12 can be separated, broken off for example.

Figure 2:
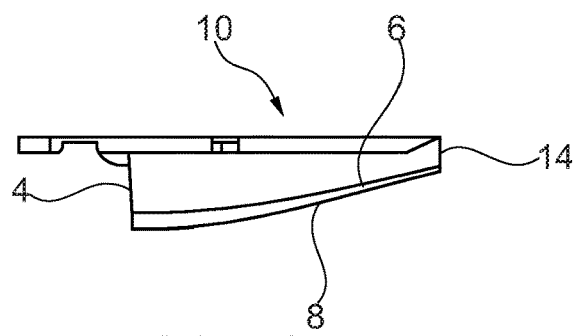
FIG. 2 is a side view of the first embodiment example according to FIG. 1.

FIG. 2 depicts a side view of the light guiding device of FIG. 1. Light can enter the light guiding device 2 through the light incoupling side 4, especially basically parallel to the light outcoupling side 10. The reflection side 6 and the reflection layer 8 then deflect the light in the direction of the light outcoupling side 10.

Figure 3:
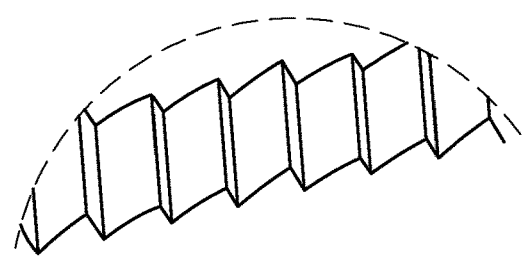
FIG. 3 is a reflection side or reflection layer having a step-like structure.

FIG. 3 depicts an enlarged representation of a reflection side 6 and/or reflection layer 8 configured step-like. Such a step-like configuration, which can alternatively or additionally be wave-like, can improve the guidance of the light beam arriving from the light incoupling side 4 to the effect that the light outcoupling by the light outcoupling side 10 is distributed as homogeneously as possible and uniformly across the light outcoupling side 10.

Figure 4:
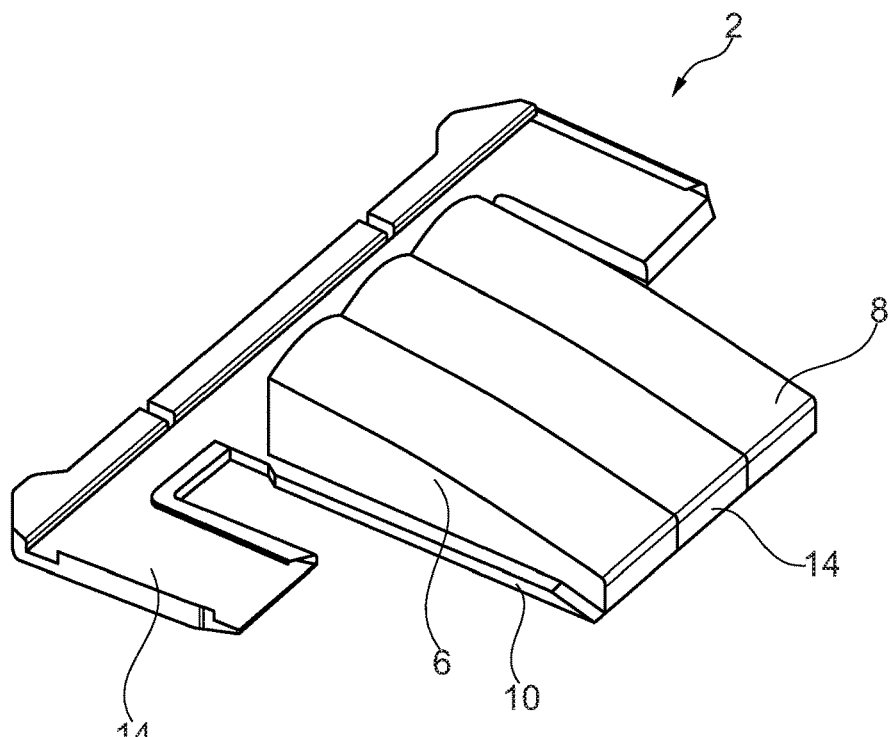
FIG. 4 is a perspective view of the embodiment example according to FIG. 1.

FIG. 4 depicts the light guiding device 2 in a perspective representation. The light guiding device 2, which is optimized for three light sources 18, has a reflection side 6 and reflection layer 8 configured with three funnels. The longitudinal axis of these funnels extends along the principal direction of the incoupled light. The light guiding device 2 can be adapted for any other number of light sources 18, such as 1, 2, 3, 4, 5, 6 or more.

Figure 5:
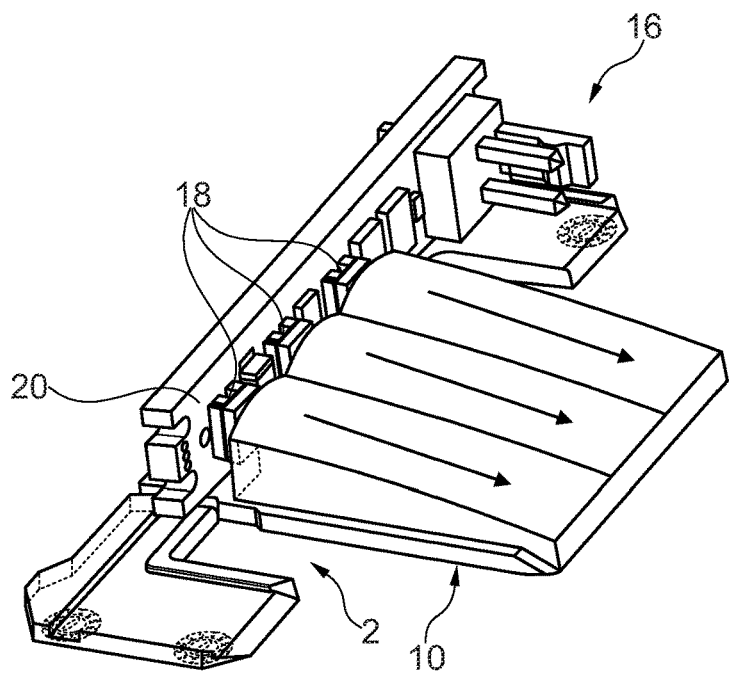
FIG. 5 is a perspective view of an illumination device having a light guiding device with focus on the light incoupling.
Figure 6:
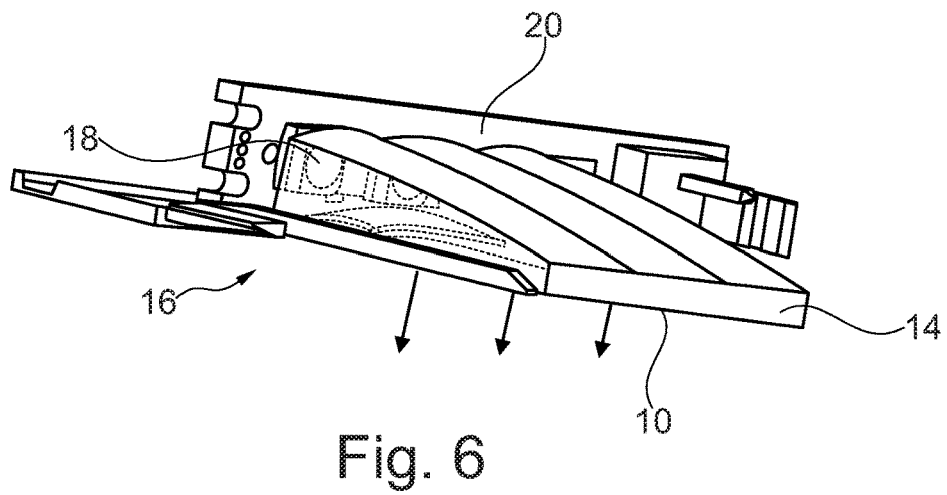
FIG. 6 is a perspective view of an illumination device having a light guiding device with focus on the light outcoupling.

FIG. 5 depicts an illumination device 16 having three light sources 18 which are arranged on a printed circuit board 20. The printed circuit board 20 having the LED light sources 18 is so arranged with respect to the light guiding device 2 that the light is emitted essentially parallel to the light outcoupling side 10, as illustrated by the arrows. To this end, the reflection side 6 and especially the reflection layer 8 deflect the light so that it leaves the light guiding device 2 via the light outcoupling side 10, as seen from the arrows in FIG. 6.

Figure 7:
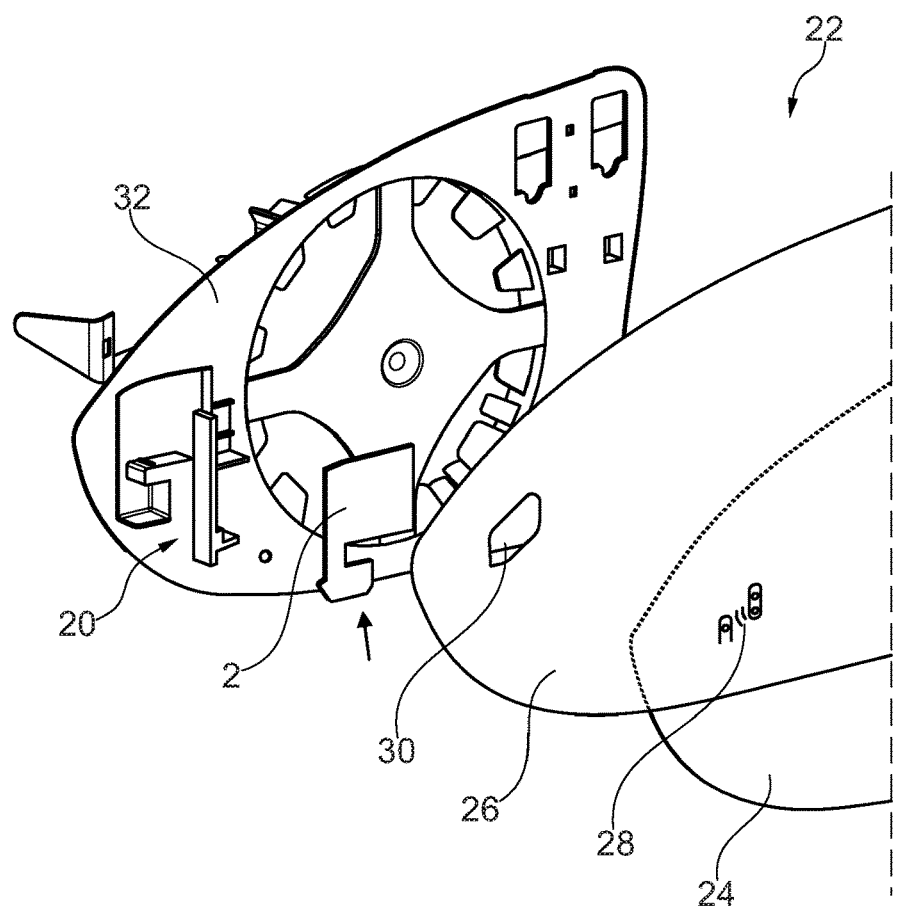
FIG. 7 is an exploded view of a rearview device having a light guiding device.

FIG. 7 depicts an explosion view of a rearview device 22 having a light guiding device 2, which can be arranged on a printed circuit board 20 or directly on a mounting 32. The rearview device 22 furthermore has a rearview reflection surface 24 and a heating layer 26 thereunder, wherein the rearview reflection surface 24 has a pictogram for a blind spot monitor indicator, which can be illuminated by the light guiding device 2 and by a recess 30 in the heating layer 26. The printed circuit board 20, light guiding device 2 and rearview reflection surface 24 having the heating layer 26 can be arranged on a mounting 32. For the sake of clarity, the remaining parts of the rearview device 22, like the housing for example, are not illustrated.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A rearview device for a motor vehicle having a rearview reflection surface, an illuminant and a light guiding device wherein the light guiding device, light source and rearview reflection surface are arranged together in such a way that the light guiding device deflects the light emitted by the light source to a side of the rearview reflection surface facing away from the driver of the vehicle and transmitted through a portion of the reflection surface toward the driver to illuminate an indicator device of a driver assistance system or a blind spot monitor; and
   wherein one region of the rearview reflection surface comprises a non-reflecting or partially reflecting part, especially a pictogram, which is backlit by the light source and the light guiding device, the light guiding device comprising:
   a. a light incoupling side for incoupling light from a light source;
   b. a reflection side having a reflection layer; and
   c. a light outcoupling side, which is disposed generally opposite the reflection side,
wherein the reflection layer has at least one of a step-like or wave-like surface contour disposed onto at least a portion of the reflection side, and a clearance between the reflection side and the light outcoupling side generally decreases as the distance from the light incoupling side increases and the reflection side having the reflection layer is configured so that light arriving from the light incoupling side is deflected to the light outcoupling side, and
the reflection layer includes a paint that is imprinted on the step-like or wave-like surface contour.

2. The light guiding device according to claim 1, wherein the reflection layer at least partially comprises the same or different material than the rest of the light guiding device.

3. The light guiding device according to claim 1, wherein the reflection layer is white.

4. The light guiding device according to claim 1, further including a color layer wherein the color layer has a heat resistance of around −40° C. to +115° C.

5. The light guiding device according to claim 1, wherein at least one of the reflection side and the reflection layer is configured at least partially step-like or wave-like.

6. The light guiding device according to claim 1, wherein the light incoupling side and the light outcoupling side are configured flat and these surfaces are arranged essentially orthogonal to one another.

7. The light guiding device according to claim 1, wherein the light guiding device is embodied so that light coupled into the light guiding device and/or reflected and/or outcoupled experiences no change in color or a change in color, especially to red or yellow or green.

8. The light guiding device according to claim 1, wherein arrangement of one or a plurality of color filters on the light incoupling side and/or the reflection side and/or the reflection layer and/or the light outcoupling side and/or inside the light guiding device to achieve a change in color.

9. The light guiding device according to claim 8, wherein light from a light source, which emits white light, is outcoupled colored from the light guiding device in at least one of red or yellow or green.

10. The light guiding device according to claim 1, further comprising a holding device for tight or loose assembly onto a printed circuit board.

11. An illumination device, especially for a motor vehicle or an indicator device of a rearview device of a motor vehicle, comprising a light guiding device according to claim 1 and a printed circuit board having at least one light source, wherein the light source is arranged relative to the light guiding device so that the light emitted by the light source onto the light incoupling side of the light guiding device is incoupled therein.

* * * * *